A. P. GUBRUD.
OPEN MOLDBOARD FOR PLOWS.
APPLICATION FILED SEPT. 7, 1910.
1,027,044.
Patented May 21, 1912.
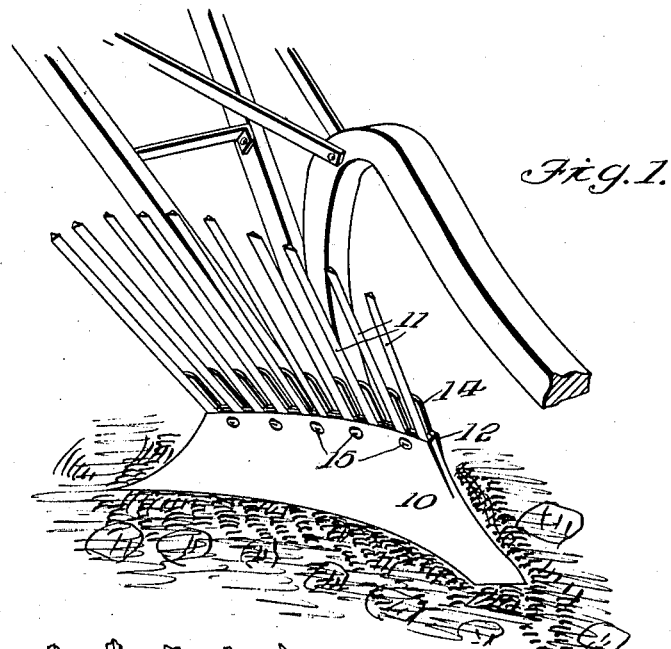
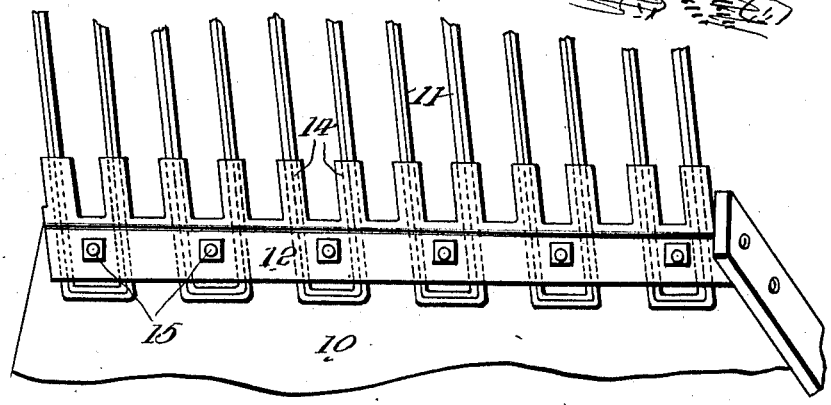
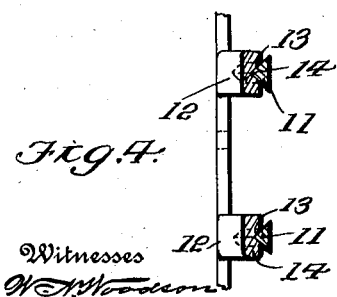
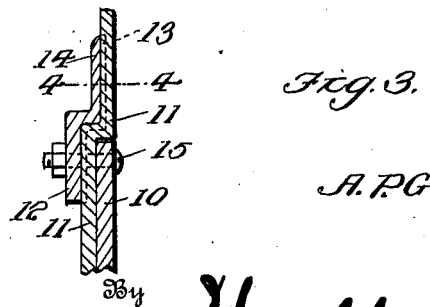
Inventor
A. P. Gubrud.

UNITED STATES PATENT OFFICE.

ADOLPH P. GUBRUD, OF HUDSON, SOUTH DAKOTA.

OPEN MOLDBOARD FOR PLOWS.

1,027,044. Specification of Letters Patent. Patented May 21, 1912.

Application filed September 7, 1910. Serial No. 580,841.

*To all whom it may concern:*

Be it known that I, ADOLPH P. GUBRUD, citizen of the United States, residing at Hudson, in the county of Lincoln and State of South Dakota, have invented certain new and useful Improvements in Open Moldboards for Plows, of which the following is a specification.

This invention relates to plows and refers particularly to an open moldboard for plows employing the same.

An object of the invention is to form an open moldboard of spaced rods of peculiar form which may be removed from the share of the plow and replaced when broken, and which are of peculiar form to withstand the wear incident to their use, and are reinforced by a novel clamping bar which is carried upon the share of the plow.

For a full understanding of the invention reference is to be had to the following description and accompanying drawing in which:—

Figure 1 is a perspective view of the improved moldboard as applied to a plow. Fig. 2 is an elevation of the inner side of the share of a plow showing the manner of attaching the moldboard. Fig. 3 is a transverse sectional view through the same. Fig. 4 is a section on the line 4—4 of Fig. 3.

Corresponding and like parts are referred to in the following description and indicated in all the views of the accompanying drawing by the same reference characters.

Referring to the drawing the numeral 10 designates the share of a plow which is of common form. The share 10 is provided with a plurality of equi-distantly spaced rods 11 which are preferably formed in pairs, the same being integral at their lower ends. The rods are each of triangular cross-section having the flattened faces thereof turned outwardly in flushed relation with the outer surface of the share 10.

As will be observed from Fig. 3 the lower ends of the rods 11 are offset so as to seat the lower extremities thereof across the inner face of the share 10. A clamping bar 12 is secured across the inner side of the share 10 at its upper edge and is provided at equi-distant points with angular transverse recesses 13 for the reception of the inwardly directed angular faces of the bars 11. The clamping bar 12 is provided with a plurality of bracing fingers 14 extending upwardly from the bar 12 in registration with the angular recesses 13 and having formed therein continuations of the recesses.

The bracing fingers 14 are offset to fit snugly against the inner faces of the bars 11. The fingers 14 extend considerably above the upper edge of the share 10 and thereby brace or support the rods 11. A clamping bolt 15 passes through the clamping bar 12 at a point midway of the lower ends of each pair of rods 11, the clamping bolts 15 passing through the share 10 to secure the bar 12 rigidly against the lower ends of the rods 11. From this construction the rods 11 may be removed from the share 10 by releasing the clamping-plate 12 and other rods can be quickly secured between the clamping-plate 12 and the share 10 when it is desired to renew the same.

It will of course be understood that the spaced rod 11 may be given the desired curve to form a moldboard for various kinds of plows.

Having thus described the invention what is claimed as new is:—

In combination with a share, a skeleton mold board composed of U-shaped rods each provided at both of its side portions with a shoulder, said rods being of uniform transverse sectional area throughout their lengths, the shoulders of all of the rods being seated upon the upper edge of the share, a bar having recesses which receive the rear side portions of the rods and which is spaced by the rods from the share and having a portion which lies over the shoulders of the rods, and draw bolts passing transversely through the share and bar and located one between the side portions of each rod and spaced from the side portions of the rods, whereby the rods are clamped in position between the share and the bar by the drawing action of the bolts.

In testimony whereof I affix my signature in presence of two witnesses.

ADOLPH P. GUBRUD. [L. S.]

Witnesses:
P. P. DAHL, Jr.,
A. P. DAHL.

Copies of this patent may be obtained for five cents each, by addressing the "Commissioner of Patents, Washington, D. C."